United States Patent Office 3,150,146
Patented Sept. 22, 1964

3,150,146
POLY CARBOXYARYL PYRIDINES
Ellis K. Fields, Chicago, Ill., assignor to Standard Oil Company, Chicago, Ill., a corporation of Indiana
No Drawing. Filed Feb. 28, 1961, Ser. No. 92,132
3 Claims. (Cl. 260—295)

This invention relates to pyridine polycarboxylic acids and more particularly pertains to pyridine-aryl-carboxylic acids wherein a pyridine nucleus contains at least one substituent comprising an aryl carboxylic acid group. This invention also relates to the process for making said pyridine-aryl-carboxylic acids.

A new class of carboxylic acids has been discovered. These carboxylic acids contain a pyridine nucleus substituted with from 1 to 3 aryl carboxylic acid groups. The aryl carboxylic acid substituents can contain from 1 to 3 carboxylic acid groups. These new acids can be illustrated by the following structural formula:

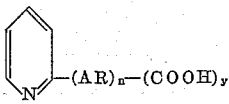

wherein AR is an aryl hydrocarbon radical, $n$ is an integer of from 1 through 3 and $y$ is an integer of from 1 through 15. Typical aromatic hydrocarbon radicals illustrative of AR in the formula of the pyridine-aryl-carboxylic acids hereinbefore given are those derived from phenyl, biphenyl, naphthyl, and the like aromatic hydrocarbon groups. Desirably AR (the aryl hydrocarbon radical) contains 1 or 2 aromatic rings as in derivatives of benzene, naphthalene and biphenyl. The preferred compounds of the class hereinbefore illustrated are those containing a single benzenoid ring as AR and, hence, are pyridine-poly (phenyl carboxylic) acids. Illustrative of the preferred class of pyridine-aryl-carboxylic acids are pyridine-poly benzoic acids, pyridine-poly phthalic acids, and pyridine-poly (phenyltricarboxylic) acids such as the derivatives of pyridine containing as the substituent groups, groups derived from trimetallic and trimesic acids.

The pyridine-aryl-carboxylic acids hereinbefore illustrated can be readily prepared by the catalytic liquid phase oxidation with a gas containing free oxygen of compounds containing the pyridine nucleus substituted with alkaryl hydrocarbon groups. Such oxidation feed stock compounds can be illustrated by the following structural formula:

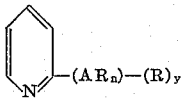

wherein AR, $n$ and $y$ have the significance hereinbefore described for the pyridine-aryl-carboxylic acids and R is an alkyl hydrocarbon radical containing from 1 to 3 carbon atoms. The alkyl hydrocarbon radical is, therefore, methyl, ethyl, propyl, and isopropyl groups. Such alkaryl substituted pyridines are known chemical compounds. They can be readily prepared by reacting an ar-alkyl aryl methyl ketone with hydroxylamine hydrochloride or by reacting an ar-alkyl aryl pyryllium perchlorate with ammonia. Such processes are described by Gasteldi in Gazz., 51, II, 306 (1922) and by Dilthey in J. pr. (2) 102, 223 (1921).

As hereinbefore disclosed the pyridine-aryl carboxylic acids are prepared by the catalytic liquid phase oxidation of the corresponding pyridine substituted with an alkaryl group. The catalytic liquid phase oxidation process is carried out in the presence of acetic acid as the reaction solvent. These oxidation reactions are carried out at a temperature in the range of from 200 to 500° F. The minimum pressure for any temperature within said temperature range is that pressure which will maintain acetic acid in the liquid phase. It is advantageous to remove heat of reaction by permitting the acetic acid to boil from the reaction medium and condense the acetic acid vapors, returning the condensate to the oxidation zone. For the foregoing temperature range, pressures of from 1 to 1000 p.s.i.g. will be found suitable for the oxidation process. The oxidation process employs as the oxidizing agent a gas containing free oxygen. For the purposes of this invention pure oxygen, commercial oxygen, mixtures of oxygen and ozone, ozone, air, mixtures of oxygen and inert gases, mixtures of air and inert gases, and air enriched with oxygen can be employed as the source of gas containing free oxygen. Gases containing free oxygen having an oxygen content of from 5 to 100% by volume are suitable for the catalytic liquid phase oxidation.

The preferred catalyst for the above oxidation process is a catalyst system provided by the presence of ions of heavy metal oxidation catalysts together with ions of bromine. The ions of bromine in the catalyst system can be supplied by adding to the oxidation zone elemental, combined, or ionic bromine. Specific sources of bromine ions in the catalyst system can be supplied by molecular bromine, ammonium bromide, hydrogen bromide, sodium bromide, potassium bromate, benzyl bromide, and tetrabromoethane, as well as heavy metal bromides. The ion of heavy metal oxidation catalysts in the above-defined catalyst system can be supplied by employing the heavy metals per se, salts of the heavy metals and other derivatives of the heavy metals which are soluble in acetic acid. The term "heavy metal" is employed herein in the same sense as employed in connection with the metals shown in the "Periodic Chart of Elements," appearing on Pages 56 and 57 of the "Handbook of Chemistry," 8th Edition, published by Handbook Publishers, Inc., Sandusky, Ohio (1952). From this group there have been found heavy metal oxidation catalysts desirably applicable to the process of this invention for furnishing the heavy metal oxidation component of the catalyst system. Of the heavy metal group, those metals having an atomic number not greater than 84 have been found most useful. Excellent results are obtained by the utilization of metals having an atomic number of from 23 to 28 inclusive. Particularly excellent results are obtained with a metal of the group consisting of manganese, cobalt, nickel, iron, chromium, vanadium, molybdenum, tungsten, tin, and cerium. The catalytic amount of the heavy metal may be provided either by a single metal or a combination of the metals. The heavy metal oxidation catalyst component of the catalyst system in the process of this invention may be provided by the addition of the metal in elemental form, as its oxide or hydroxide, or in the form of a salt of the metal for these forms of the metal will provide heavy metal ions in the reaction medium. For example, the metal manganese may be employed as the manganese salt of an organic carboxylic acid, such as manganese naphthenate, manganese toluate, manganese acetate, etc., or in the form of an organic complex, such as the acetylacetonate, the 8-hydroxy-quinolate, and the ethylene diamine tetraacetate, as well as inorganic manganese salts such as the borates, halides and nitrates. The catalyst system may also be provided by the use of a heavy metal bromide or mixtures of heavy metal bromides.

The amount of metal catalyst employed is not critical and may be in the range of about 0.01 to about 10% by weight or more based on the feed stock reactant. Where the heavy metal is introduced as a bromide salt, for example as manganese bromide, the proportions of manganese and bromine will be in their stoichiometric proportions. The ratio of metal to bromine may be varied from such proportions within the range of about 1 to 10 atoms of heavy metal oxidation catalyst per atom of bromine to about 1 to 10 atoms of bromine per atom of heavy metal.

The amount of acetic acid reaction solvent employed can be varied to provide an initial reaction mixture that contains from 50 to 95% acetic acid based on the weight of the reaction mixture, acetic acid plus the substituted pyridine. Preferably the amount of acetic acid employed will constitute from 65–85% of the oxidation mixture containing the substituted pyridine.

The preferred heavy metal ions in the catalyst system are cobalt and/or manganese, and it is preferred to provide these ions by the addition of from 1 to 5 parts by weight of each of cobalt acetate and manganese acetate per 400 parts of substituted pyridine to be oxidized. It is also preferred to supply the bromine ions for the catalyst system by the use of sodium or ammonium bromide. For convenience of operation an aqueous solution containing cobalt acetate and/or manganese acetate together with sodium or ammonium bromide can be prepared and added to the acetic acid solution of the substituted pyridine to be oxidized.

Air is the preferred gas containing free oxygen. When air is employed as the oxidizing agent, it is passed into the reaction mixture in an oxidation zone at the rate of 2 to 20 liters per minute for 0.5 to 6 hours or until the exit gas from the oxidation zone contains on an acetic acid free basis from 19 to 20% oxygen by volume.

By the oxidation process hereinbefore described and hereinafter illustrated, there can be prepared the following solid carboxyaryl pyridines:

Illustrative of the alkaryl substituted pyridines to be oxidized to the corresponding pyridine-aryl-carboxylic acids include mono, di, tri alkylaryl pyridines such as 2-p-tolyl pyridine; 2,6-di(p-tolyl) pyridine; 2,4,6-tri(p-tolyl)pyridine; 2,3,4,5,6-penta(p-tolyl) pyridine; 3-phenyl-2,6-di(p-tolyl) pyridine; 2,6-di-m-tolyl) pyridine; 2,4,6-tri(o-tolyl)pyridine; 2,6-di(p-ethyl phenyl) pyridine; 2,4,6-tri(p-ethyl phenyl) pyridine; 2-(p-cumyl) pyridine; 2,6-di-(p-cumyl) pyridine; 2,4,6-tri(p-cumyl) pyridine; 2,6-di(4'-methyl biphenyl) pyridine; 2,6-di(α-methylnaphthyl) pyridine; 2,6-di(o-, m- or p-xylyl) pyridine; 2-duryl pyridine; 2,4,6-tri(duryl) pyridine; 2,4,6-tri(pentamethylnaphthyl) pyridine.

The process for preparing illustrative compounds of this invention is described by the following examples which also characterize the new acids. In these examples 4-phenyl-2,6-di(p-tolyl) pyridine and 2,4,6-tri(p-tolyl) pyridine are oxidized to their corresponding di- and tricarboxylic acids. The substituted pyridine feed stocks employed in the oxidation reactions were prepared in the following manner.

*4-Phenyl-2,6-di(p-tolyl) pyridine.*—Benzal di-p-methyl acetophenone,

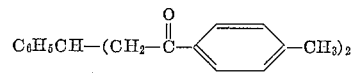

is prepared in 63% yield from benzaldehyde and p-methyl acetophenone according to St. V. Kostanecki and G. Rossbach, Ber. 29, 2247 (1896). It melts at 113–114°; lit., 115–116° C.

| Carboxyaryl Pyridine | From | ar-Alkaryl Pyridine |
|---|---|---|
| 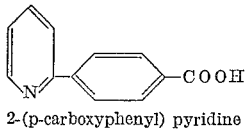<br>2-(p-carboxyphenyl) pyridine | | 2-p-tolyl pyridine<br>2-(p-ethylphenyl) pyridine<br>2-(p-cumyl) phenyl pyridine |
| 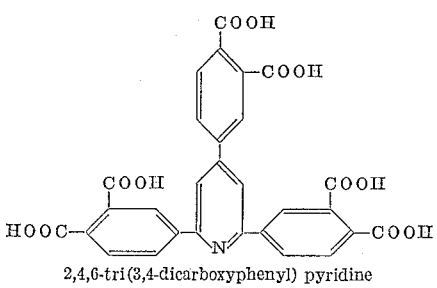<br>2,4,6-tri(3,4-dicarboxyphenyl) pyridine | | 2,4,6-tri(3,4-dimethylphenyl) pyridine |
| 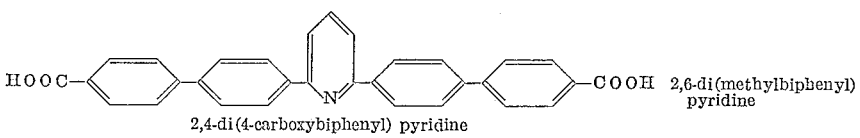<br>2,4-di(4-carboxybiphenyl) pyridine | | 2,6-di(methylbiphenyl) pyridine |
| 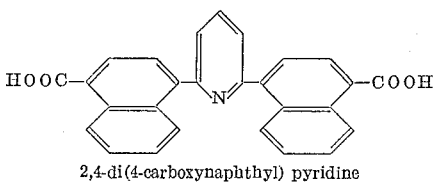<br>2,4-di(4-carboxynaphthyl) pyridine | | 2,6-di(4-methylnaphthyl) pyridine |
| 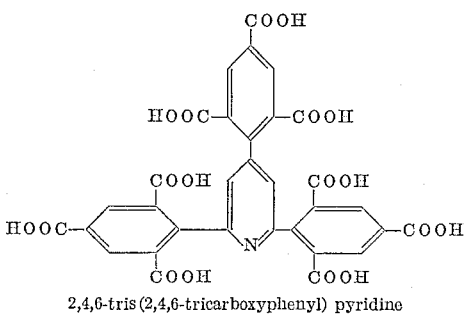<br>2,4,6-tris(2,4,6-tricarboxyphenyl) pyridine | | 2,4,6-tris(2,4,6-trimethylphenyl) pyridine |

A solution of 178 g. (0.5 mole) benzal di-p-methyl acetophenone and 34.75 g. (0.5 mole) hydroxylamine hydrochloride in 600 ml. alcohol is refluxed 6 hours. To the cooled solution is added 62 ml. aqueous NH$_4$OH with stirring. The precipitated solid is collected on a filter and recrystallized from 3 liters alcohol, giving 67.1 g. (36%) 4-phenyl-2,6-di-p-tolyl pyridine. It melts at 159–160° C. The only other preparation of this compound is by Dilthey, J. pr. (2) 102, 223, who made it by reacting 4-phenyl-2,6-ditolyl pyryllium perchlorate with NH$_3$. His melting point was 158–159°.

2,4,6-Tri(p-tolyl) pyridine.—A solution of 60 g., 0.5 mole, p-tolualdehyde and 134.2 g., 1 mole, p-methyl acetophenone in 600 ml. alcohol is treated with 60 g. NaOH in 100 ml. water. The resulting solution is heated on the steam bath. A solid precipitates after 5 minutes, then goes back into solution. After 20 minutes the mixture is cooled and diluted with 300 ml. water. The oily precipitate is taken up in ether, washed 2 times with water, filtered and evaporated. The residual oil is refluxed with 35 g. hydroxylamine hydrochloride for 6 hours: 20 ml. concentrated hydrochloric acid are added, and the mixture is evaporated on the steam bath. The residue is dissolved in alcohol and treated with excess NH$_4$OH, precipitating 2,4,6-tri-p-tolyl pyridine as a white solid. After crystallization from alcohol it gives fine white needles melting at 173–175°; 32 g., 18% yield. Gasteldi, Gazz, 51, II, 306 gives 177° C. as the melting point.

The above substituted pyridines were oxidized to their corresponding carboxylic acids according to the following techniques.

*Example I*

A mixture of 61.7 g. (0.181 mole) 4-phenyl-2,6-di-p-tolyl pyridine, 143 ml. (150 g., 2.5 moles) acetic acid, and 6 ml. aqueous solution containing 0.2 g. cobalt acetate, 0.4 g. manganese acetate, and 1 g. NH$_4$Br is oxidized at 400° F. with air at 400 p.s.i.g. going through at 0.13 cu. ft. per minute for 1 hour. The reaction contents are cooled and filtered, giving 51 g. 4-phenyl-2,6-di-p-carboxyphenyl pyridine, melting at 314–316° C. The yield is 72%. An additional 14 g. crude acid (20%) is obtained from the reactor washings. Recrystallization from acetic acid gives a white solid melting at 318° C.

ANALYSIS

|   | Calculated for C$_{25}$H$_{17}$NO$_4$ | Found in Product |
|---|---|---|
| C | 75.5 | 75.80 |
| H | 4.3 | 4.75 |
| N | 3.55 | 3.11 |
| Acidity, mg | 284 | 306 |

*Example II*

A mixture of 32 g. (0.0916 mole) 2,4,6-tri-p-tolyl pyridine, 143 ml. (150 g., 2.5 moles) acetic acid, and 6 ml. aqueous solution containing 0.2 g. cobalt acetate, 0.4 g. manganous acetate, and 1 g. ammonium bromide is oxidized at 400–410° F. with air at 400 p.s.i.g. going through at 0.13 cubic foot per minute for 52 minutes. The reactor contents are cooled and filtered, giving 13 g. acid melting at 350–353° C. Additional crude acid from washing the reactor weighs 17 g. and melts at 315–338° C. Total yield, 75%. The acid is recrystallized from acetic acid and melts at 368–373° C.

ANALYSIS

|   | Calculated for 2,4,6-tri-p-carboxyphenyl pyridine, C$_{26}$H$_{17}$NO$_6$ | Found in Product |
|---|---|---|
| N | 3.2 | 2.78 |
| Acidity, mg | 381 | 378 |

The new class of carboxylic acids of this invention can be converted to esters by conventional esterification processes and as such the esters are useful as plasticizers for polyvinyl resins. The polyacids can be reacted with polyfunctional alcohols such as ethylene glycol to form polyesters such as the beta-hydroxyethyl esters which can be further reacted to form high molecular weight polyester products. The beta-hydroxyethyl ester derivates also can be further reacted with other poly-acids such as adipic acid to form macromolecular polyester products which with isocyanates form polyurethanes. Esters of the acids of this invention containing long, straight or branched chain alkyl groups of C$_8$ to C$_{22}$ can be employed as functional fluids, to prepare functional fluid compositions or as solvents. The polyacids of this invention can be employed in the preparation of polyamides through the reaction with poly-amines such as hexamethylene diamine. A high molecular weight polyester of 4-phenyl-2,6-di(p-carboxyphenyl) pyridine with 1,1-dimethyl-1,1-di(p-hydroxyphenyl) methane (Bis-phenol A) can be prepared having a softening point of 220° C. and a melting point of 270° C. A film cast from this polyester is hard and brittle, but a film cast from this polyester plasticized with di-n-butylphthalate and baked at 100° C. is a tough, clear film having no brittleness. Such a film can be readily cast from dimethyl formamide solutions.

What is claimed is:

1. A carboxy aryl pyridine selected from the class consisting of 4-phenyl-2,6-di(p-carboxyphenyl) pyridine,
2,4,6-tri(p-carboxyphenyl) pyrdidine,
2-(p-carboxyphenyl) pyridine,
2,4,6-tri(3,4-dicarboxyphenyl) pyridine,
2,4-di(4-carboxybiphenyl) pyridine,
2,4-di(4-carboxynaphthyl) pyridine, and
2,4,6-tris(2,4,6-tricarboxphenyl) pyridine.

2. The compound 4-phenyl-2,6-di(p-carboxyphenyl) pyridine having the formula:

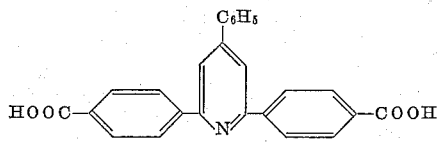

3. The compound 2,4,6-tri(p-carboxyphenyl) pyridine having the formula:

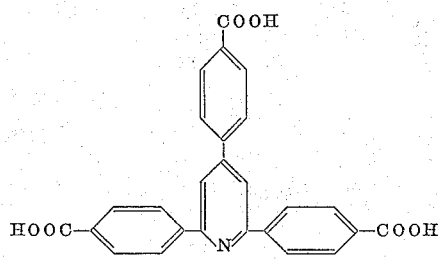

References Cited in the file of this patent

UNITED STATES PATENTS

| 1,937,962 | Jaeger | Dec. 5, 1933 |
| 2,437,938 | Cislak et al. | Mar. 16, 1948 |
| 3,012,038 | O'Neill et al. | Dec. 5, 1961 |

OTHER REFERENCES

Gasteldi: Gazz. Chim. It., vol. 51, p. 306 (1921).
Dilthey: J. Prakt. Chemie, vol. 102, p. 223 (1921).

UNITED STATES PATENT OFFICE
CERTIFICATE OF CORRECTION

Patent No. 3,150,146             September 22, 1964

Ellis K. Fields

It is hereby certified that error appears in the above numbered patent requiring correction and that the said Letters Patent should read as corrected below.

Column 1, line 40, for "trimetallic" read -- trimellitic --; lines 48 to 52, for that portion of the formula reading:

$$—(AR_n)— \quad \text{read} \quad —(AR)_n—$$

column 4, line 6, for "2,6-di-m-tolyl) read -- 2,6-di(m-tolyl) --; column 6, line 8, for "derivates" read -- derivatives --; line 34, for "pyrdidine" read -- pyridine --; same column 6, line 39, for "tricarboxphenyl" read -- tricarboxyphenyl --.

Signed and sealed this 12th day of January 1965.

(SEAL)
Attest:

ERNEST W. SWIDER             EDWARD J. BRENNER
Attesting Officer             Commissioner of Patents